United States Patent
Bonte et al.

(12)

(10) Patent No.: US 6,274,696 B1
(45) Date of Patent: Aug. 14, 2001

(54) CONTINUOUS PROCESS FOR THE PRODUCTION OF SEGMENTED ELASTOMER POLYESTER COPOLYMER

(75) Inventors: Geert I. V. Bonte, Diepenbeek (BE); Rainer Hagen; Eike Schulz Van Endert, both of Berlin (DE)

(73) Assignees: DSM N.V., Heerleen (NL); Inventa Fischer GmbH, Berlin (DE)

( * ) Notice: Subject to any disclaimer, the term of this patent is extended or adjusted under 35 U.S.C. 154(b) by 0 days.

(21) Appl. No.: 09/659,740

(22) Filed: Sep. 11, 2000

Related U.S. Application Data

(63) Continuation of application No. PCT/NL99/00132, filed on Mar. 10, 1999.

(30) Foreign Application Priority Data

Mar. 11, 1998 (NL) .................................................. 1008562

(51) Int. Cl.$^7$ .................................................. C08G 63/00
(52) U.S. Cl. .................................................. 528/176
(58) Field of Search ............................................ 528/176

(56) References Cited

U.S. PATENT DOCUMENTS 4,772,652    9/1988    Yoshifumi et al. .................. 524/394

*Primary Examiner*—Terressa M. Boykin
(74) *Attorney, Agent, or Firm*—Pillsbury Winthrop LLP

(57) ABSTRACT

The invention relates to a continuous process for the preparation of segmented elastomer polyester copolymers that shows greater flexibility with respect to the types and amounts of product to be produced than the known processes.

Figure 1:
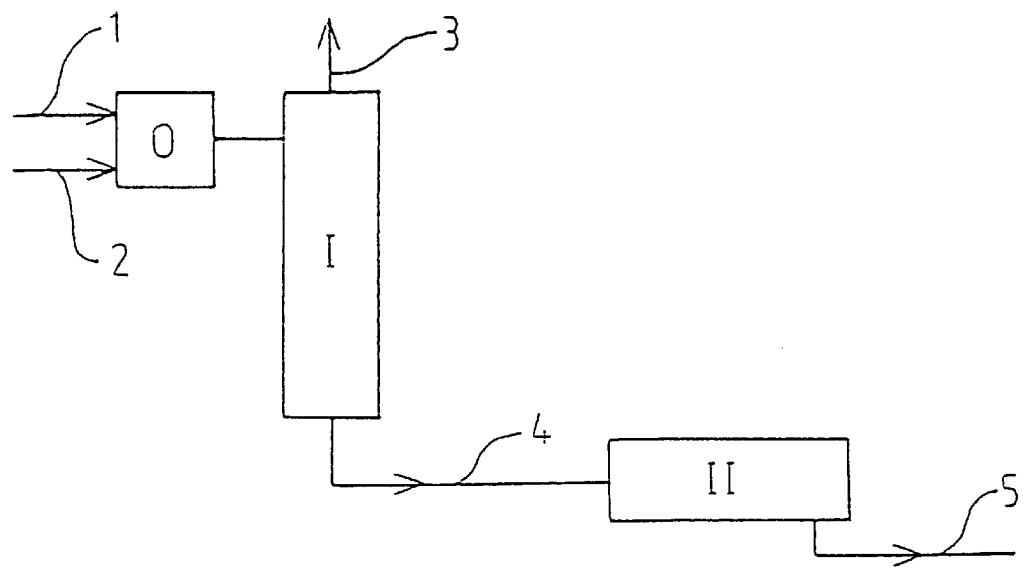

The flexibility is achieved by splitting up a low-molecular PBT product stream from a continuous PBT process and partly using it as feed for the transesterification reaction with the polyalkyleneoxide glycol yielding soft segments to form a low-molecular segmented polyester copolymer, which is subsequently further condensed in the melt or optionally in the solid phase to form high-molecular segmented polyester copolymers.

Even greater flexibility can be obtained by operating several parallel production lines for segmented polyester copolymer.

Fluctuations in the types of copolyester product to be produced and the amounts thereof are accommodated predominantly in the polycondensation step of the PBT production.

5 Claims, 1 Drawing Sheet

CONTINUOUS PROCESS FOR THE PRODUCTION OF SEGMENTED ELASTOMER POLYESTER COPOLYMER

This is a continuation of international Appln. No. PCT/NL99/00132 filed Mar. 10, 1999 which designated the U.S.

The invention relates to a process for the continuous preparation of segmented elastomer polyester copolymers. Such processes are for example described in the Encyclopedia of Polymer Science and Technology, Vol. 12, pp. 84–85 (1986), and the references therein and they show a close correspondence to the continuous processes for producing polyethylene terephthalate and polybutylene teraphthalate, PET and PBT respectively. These processes essentially comprise a 2-step process, in which, in the first process step, the monomers, in this case the diols and the dicarboxylic acids or esters thereof, required for the formation of the hard and soft segments of the elastomer copolyester are mixed with optionally catalyst, additives, for example stabilisers, and optionally branching agents, for example a trifunctional carboxylic acid or alcohol or a precursor thereof, for example trimellitic acid anhydride, and heated to a temperature at which, through primarily a transesterification reaction or an esterification reaction, a low-molecular copolyester is formed, this prepolymerisation step being followed by a melt polycondensation, often referred to as a transesterification, in which the diol required for the formation of the hard segments, which is released in the polycondensation, is discharged at reduced pressure.

The first reaction is preferably carried out in a vertical polymerisation column, in which the pressure gradually decreases and the temperature increases, and the second reaction in a horizontal thin film finisher, a large area being created to enable the discharge of the alkylene glycol released. The continuous production method presents economic advantages in the case of the production of a single type of segmented copolyester. But in the case of the production of higher molecular types, the residence times required become too long and the advantage of the large scale cannot be exploited. In addition, switching to a different type of product is time-consuming owing to the size of the installations.

For various reasons it is advantageous if in the first reaction step use is made not of the monomers required for the hard and soft segments, but of an oligomer of the segments that already has approximately the desired length of the segment. In some cases, in particular in the case of segmented copolyesters, it is advisable to introduce the polymer yielding the hard segments into the transesterification reaction in a higher molecular weight. The soft segments are often already present in the form of a polyether polyol or a polyester polyol and are used as such.

But the preparation of the oligomers required for the hard segments demands an extra synthesis step, which further complicates the process and makes a continuous process even more inflexible and difficult to control. An example of such a process is given in R.W.M. van Berkel et al. in Developments in polyether-ester and polyester-ester segmented copolymers, Chapter. 7, of Developments in block copolymers, Vol. I, Ed. I.Goodman, Applied Science, London (1982), p. 266.

The inventors have now found a solution to the problem described above and have developed a continuous process that shows substantial flexibility with respect to the number of types of segmented copolyester and the production capacity thereof, in which an oligomer or polymer for the hard segments is added to the transesterification reaction.

The continuous process according to the invention for the production of segmented elastomer polyester copolymers composed of hard and soft segments, comprising a first reaction step in which, in a transesterification or esterification reaction, a segmented copolyester with a low molecular weight is formed from oligomer or polymer fed to the first reactor, and which consists of units corresponding to the units of which the hard segments are composed, and polymer glycols yielding the units for the soft segments, and the low-molecular segmented polyester copolymer obtained in the first reaction step is in a second reaction step condensed to a desired degree of polymerisation, characterised in that the oligomer or polymer compound yielding the hard segments that is fed to the first reaction step has been obtained as part of a product stream in the synthesis of a polyester consisting entirely of ester units that form the hard segments of the segmented elastomer polyester copolymer, the remaining part of the product stream of the polyester yielding the hard segments being further polymerised to a desired degree of polymerisation in at least one further process step.

The process according to the invention will now be further explained with reference to FIGS. 1 and 2.

FIG. 1 is a schematic representation of a continuous production process for polybutylene teraphthalate (PBT). The monomers butane diol (1) and terephthalic acid (2) or the dimethyl ester thereof are fed, via mixer O, to reactor I, in which a low-molecular polybutylene terephthalate is formed, volatile reaction products are discharged via 3, the low-molecular PBT formed is fed, via 4, to polycondensation reactor II, in which the PBT is further condensed to the desired degree of polymerisation.

Examples of a number of reactor types I and II are for example described in L. Gerking, International Fiber Journal, Vol. 6, No. 2 (1991). This reaction step can optionally be followed by a third reaction step, for instance a postcondensation in the melt or solid phase, or can even be entirely replaced by an after-condensation or solid-phase polycondensation.

Figure 2:
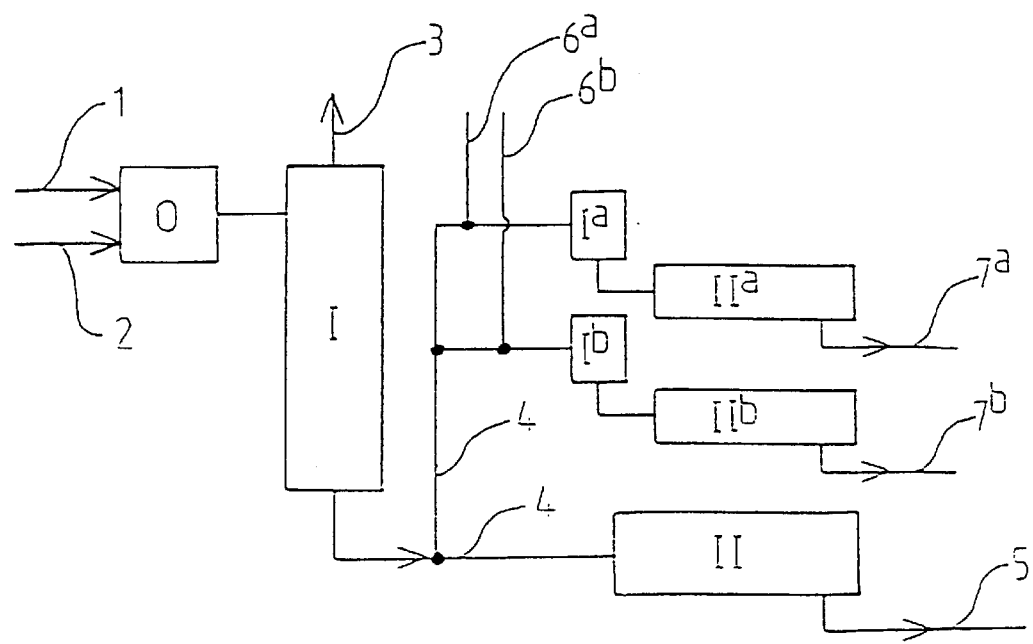

FIG. 2 shows a process according to the invention. Stream 4 is here split up and part of the low-molecular PBT is fed to one or more reactors, $I^a$, $I^b$ etc., and is together with for example polyalkyleneoxide glycol (6a) converted into low-molecular segmented polyether ester, which is subsequently fed to polycondensation reactor $II^a$, $II^b$ etc., which may optionally consist of a series of reactors. The flexibility offered by the process according to the invention is achieved for example by using several parallel lines, a, b, etc., for the simultaneous production of different types of copolyester, in which both the amounts and the types of polyalkyleneoxide glycol can be varied. With good production planning the demand for low-molecular PBT can then be kept at a relatively constant level. In the case of changes in the range of products, only the PBT polycondensation reaction needs to be modified and the effects of the changes do not extend to the beginning of the production process, as for example in the case of the continuous process for the preparation of segmented polyester copolymers described in the aforementioned publication of Van Berkel et al.

Various types of $I^a$ $I^b$, etc. transesterification reactors can be used. The reactor is preferably operated in a plug flow regime. For example in a cascade of CSTRs, continuously stirred tank reactors, a very compact design of which is for example described in DE-A-4415220. Very suitable for use as polycondensation reactors $II^{a,b}$, etc. are so-called film finishers of a type as for example described in DE-C-4447422. The product obtained from reactor $II^{a,b}$, etc. can then optionally be after-condensed in the solid phase. It is in principle also possible for the polycondensation step to be carried out entirely in the solid phase in a suitable reactor.

Even greater flexibility in processing can be obtained if reactor I has several outlets, from which low-molecular PBT of different degrees of polymerisation can be drained for use as feed in the production of the segmented polyester copolymers. Details regarding pumps, devices for dosing catalysts and additives and e.g. means for obtaining the end product in for example a granulated form have not been further specified in the above description. The usual means at the disposal of a person skilled in the art can be used for this purpose.

The reactor described in DE-A-4415220 is further improved by a design by which the residence time in the different steps increases or at least remains constant with an increasing degree of polymerisation. Positioning of the concentric walls so that equal residence times are realised in each step substantially shortens the polycondensation process step.

Other advantages of the process according to the invention are that the PBT prepolymer can be produced under constant conditions, on the basis of terephthalic acid or the dimethyl ester thereof, and that the end group balance can be accurately set and maintained, so that optimum conditions for the transesterification reaction rate and the polycondensation can be obtained.

Use can be made of the usual catalysts, for example tetrabutyl titanate, optionally with magnesium acetate as a cocatalyst, and additives, for example stabilisers, for example antioxidants of the sterically hindered phenolic type, which can be dosed at different places in the process. It is for example preferable to dose thermal stabiliser with the polyalkyleneoxide glycol and the catalyst in two steps both in reactor I and in reactor $I^{a,b}$, etc.

The process according to the invention has been explained above with reference to a segmented polyether ester with hard segments based on PBT and soft segments based on polyalkyleneoxide glycol. It will be clear to a person skilled in the art that, as the hard segments, use can be made of segments with repeating units derived from various alkylene diols and aromatic dicarboxylic acids, for example polyethylene terephthalate, polypropylene terephthalate, polybutylene naphthalate, etc., and as the soft segments segments derived from various polyalkyleneoxide glycols, for example polyethyleneoxide glycol, polypropyleneoxide glycol, polybutyleneoxide glycol etc. An extensive list of possible segments is given for example in U.S. Pat. No. 3,651,014.

The process according to the invention can in principle also be used to prepare segmented polyester ester copolymers, in which case measures must however usually be taken to passivate the catalyst present after a first transesterification reaction, so that no continuing transesterification resulting in a random copolyester can occur during the polycondensation. Segments composed of units obtained from an aliphatic glycol and an aliphatic dicarboxylic acid, for example butylene adipate or ethylene sebacate, are then used as soft segments. A frequently used soft segment is based on polycaprolactone.

The conditions under which the various reactors in the process according to the invention are operated do not in principle differ from the conditions for the relevant reactions for the various copolyesters under the conditions of a continuous process.

In the production of segmented polyether ester copolymers the degree of polymerisation of the polyester yielding hard segments that leaves reactor I is preferably lower than 30, even more preferably lower than 15 and most preferably lower than 10. Usually the degree of polymerisation is chosen to be at least 3, preferably at least 5. The molecular weight of the polyalkyleneoxide glycol is generally chosen to be between 600 and 4000, preferably between 800 and 2500, depending on the nature of the polyalkylene glycol.

The degree of polymerisation of the prepolymer that leaves reactor $I_a$, etc. is preferably chosen so that its melt viscosity is such that good film formation takes place in reactor $II^{a,b}$, etc. This melt viscosity, $\mu_o$ varies from case to case and depends on the required final viscosity and dimensions of and conditions in the reactor $II^{a,b}$, such as the temperature, and may vary between 1–100 Pa·s, preferably between 5–10 Pa·s at the prevailing temperature at which $II_a$ etc. is operated; in general at least 20° C. above the copoylester's melting point.

What is claimed is:

1. Process for the continuous production of segmented elastomer polyester copolymers composed of hard and soft segments, comprising a first reaction step in which, in a transesterification or esterification reaction, a segmented copolyester with a low molecular weight is formed from oligomer or polymer fed to the first reactor, which oligomer or polymer consists of units corresponding to the units of which the hard segments are composed, and polymer glycols yielding the units for the soft segments, and the low-molecular segmented polyester copolymer obtained in the first reaction step is in a second reaction step condensed to a desired degree of polymerisation, wherein the oligomer or polymer compound yielding the hard segments that is fed to the first reaction step has been obtained as part of a product stream in the synthesis of a polyester consisting entirely of ester units that form the hard segments of the segmented elastomer polyester copolymer, the remaining part of the product stream of the polyester yielding the hard segments being further polymerised to a desired degree of polymerisation in at least one further process step.

2. Process according to claim 1, wherein a reactor with a plug flow regime is chosen for the first reaction step.

3. Process according to claim 2, wherein the reactor with a plug flow regime is a cascade of CSTR reactors.

4. Process according to claim 3, wherein the residence time is the same in each cascade step.

5. Process according to claim 1 wherein, the reactor for the production of the low-molecular polyester yielding the hard segments has several outlets for the drainage of polymer with different degrees of polymerisation.

* * * * *